United States Patent
Marlow et al.

(10) Patent No.: US 9,602,277 B2
(45) Date of Patent: *Mar. 21, 2017

(54) USER INTERFACE SYSTEMS AND METHODS FOR SECURE MESSAGE ORIENTED COMMUNICATIONS

(75) Inventors: William J. Marlow, Herndon, VA (US); Robert Cichielo, Asbury, NJ (US); Emil Sturniolo, Medina, OH (US); Paul Benware, Mendon, NY (US)

(73) Assignee: PROTECTED MOBILTY, LLC, McLean, VA (US)

(*) Notice: Subject to any disclaimer, the term of this patent is extended or adjusted under 35 U.S.C. 154(b) by 88 days.

This patent is subject to a terminal disclaimer.

(21) Appl. No.: 12/940,213

(22) Filed: Nov. 5, 2010

(65) Prior Publication Data
US 2011/0302405 A1    Dec. 8, 2011

Related U.S. Application Data

(60) Provisional application No. 61/351,979, filed on Jun. 7, 2010.

(51) Int. Cl.
| | | |
|---|---|---|
| *H04L 29/06* | (2006.01) | |
| *H04L 9/08* | (2006.01) | |
| *H04W 12/04* | (2009.01) | |
| *H04W 12/02* | (2009.01) | |

(52) U.S. Cl.
CPC .......... *H04L 9/0841* (2013.01); *H04W 12/04* (2013.01); *H04L 2209/80* (2013.01); *H04W 12/02* (2013.01)

(58) Field of Classification Search
CPC ................. H04L 63/04; H04W 4/12
USPC ............................ 713/150; 709/225
See application file for complete search history.

(56) References Cited

U.S. PATENT DOCUMENTS

| | | |
|---|---|---|
| 5,592,555 A | 1/1997 | Stewart |
| 6,125,281 A | 9/2000 | Wells et al. |
| 6,356,937 B1 | 3/2002 | Montville et al. |
| 7,076,657 B2 | 7/2006 | Koukoulidis et al. |
| 7,424,615 B1 | 9/2008 | Jalbert et al. |
| 7,702,898 B2 * | 4/2010 | Tan ............................... 713/150 |
| 8,064,606 B2 | 11/2011 | Schuba et al. |
| 8,386,800 B2 | 2/2013 | Kocher et al. |
| 8,464,061 B2 | 6/2013 | Bradley |
| 2002/0123967 A1 | 9/2002 | Wang |
| 2002/0141591 A1 | 10/2002 | Hawkes et al. |
| 2003/0078058 A1 | 4/2003 | Vatanen et al. |
| 2003/0093680 A1 * | 5/2003 | Astley et al. ................. 713/183 |

(Continued)

FOREIGN PATENT DOCUMENTS

WO    WO 0195558    12/2001

OTHER PUBLICATIONS

May 23, 2014 Office Action in U.S. Appl. No. 13/670,994.

(Continued)

*Primary Examiner* — Evans Desrosiers
(74) *Attorney, Agent, or Firm* — Nixon & Vanderhye P.C.

(57) ABSTRACT

A convenient, easy to use ubiquitous secure communications capability can automatically encrypt and decrypt messages without requiring any special intermediating security component such as gateways, proxy servers or the like. Trusted/secure applications for the mobile workforce can significantly improve productivity and effectiveness while enhancing personal and organizational security and safety.

22 Claims, 12 Drawing Sheets

(56) References Cited

U.S. PATENT DOCUMENTS

| | | |
|---|---|---|
| 2004/0171369 A1* | 9/2004 | Little et al. .................. 455/410 |
| 2005/0081054 A1 | 4/2005 | Choo |
| 2005/0232422 A1 | 10/2005 | Lin et al. |
| 2006/0158460 A1 | 7/2006 | Uh |
| 2006/0246956 A1 | 11/2006 | Park et al. |
| 2007/0022295 A1 | 1/2007 | Little et al. |
| 2007/0072564 A1* | 3/2007 | Adams ....................... 455/115.1 |
| 2007/0083766 A1 | 4/2007 | Farnham et al. |
| 2007/0185815 A1 | 8/2007 | Boccon-Gibod et al. |
| 2008/0172730 A1 | 7/2008 | Sandhu et al. |
| 2008/0313458 A1 | 12/2008 | Fascenda et al. |
| 2009/0055643 A1 | 2/2009 | Brown et al. |
| 2009/0169013 A1 | 7/2009 | Fascenda et al. |
| 2009/0185677 A1* | 7/2009 | Bugbee ................ H04L 9/0841 380/28 |
| 2009/0228707 A1 | 9/2009 | Linsky |
| 2009/0265552 A1* | 10/2009 | Moshir ............... H04L 63/0464 713/168 |
| 2009/0268902 A1 | 10/2009 | Fascenda et al. |
| 2010/0020972 A1* | 1/2010 | Baugher et al. ............. 380/255 |
| 2010/0159962 A1 | 6/2010 | Cai et al. |
| 2011/0117883 A1* | 5/2011 | Drabo ................. H04W 12/02 455/411 |
| 2011/0138170 A1 | 6/2011 | Fascenda et al. |
| 2011/0138172 A1 | 6/2011 | McCreight et al. |
| 2011/0194695 A1 | 8/2011 | Fascenda et al. |
| 2011/0225417 A1 | 9/2011 | Maharajh et al. |
| 2012/0054493 A1 | 3/2012 | Bradley |
| 2012/0239417 A1 | 9/2012 | Pourfallah et al. |
| 2012/0239560 A1 | 9/2012 | Pourfallah et al. |
| 2013/0030828 A1 | 1/2013 | Pourfallah et al. |

OTHER PUBLICATIONS

Nov. 15, 2013 & Apr. 30, 2014 Office Actions in U.S. Appl. No. 13/670,925.

Aug. 1, 2013 & Mar. 7, 2014 Office Actions in U.S. Appl. No. 13/328,706.

Feb. 25, 2014 Office Action in U.S. Appl. No. 13/671,054.

Lisonek, David, et al., "SMS Encryption for Mobile Communication," 2008 International Conference on Security Technology, IEEE Computer Society, Dec. 2008, SecTech.2008.48, pp. 198-201.

Notice of Allowance dated Jan. 9, 2015, issued in related U.S. Appl. No. 13/328,706.

Chapman, Mark T., "Hiding the Hidden: A Software System for Concealing Ciphertext as Innocuous Text," The University of Wisconsin-Milwaukee, 1998, Under the Supervision of Professor G. I. Davida, 83 pages.

Office Action dated Jan. 16, 2015, issued in related U.S. Appl. No. 13/947,186.

* cited by examiner

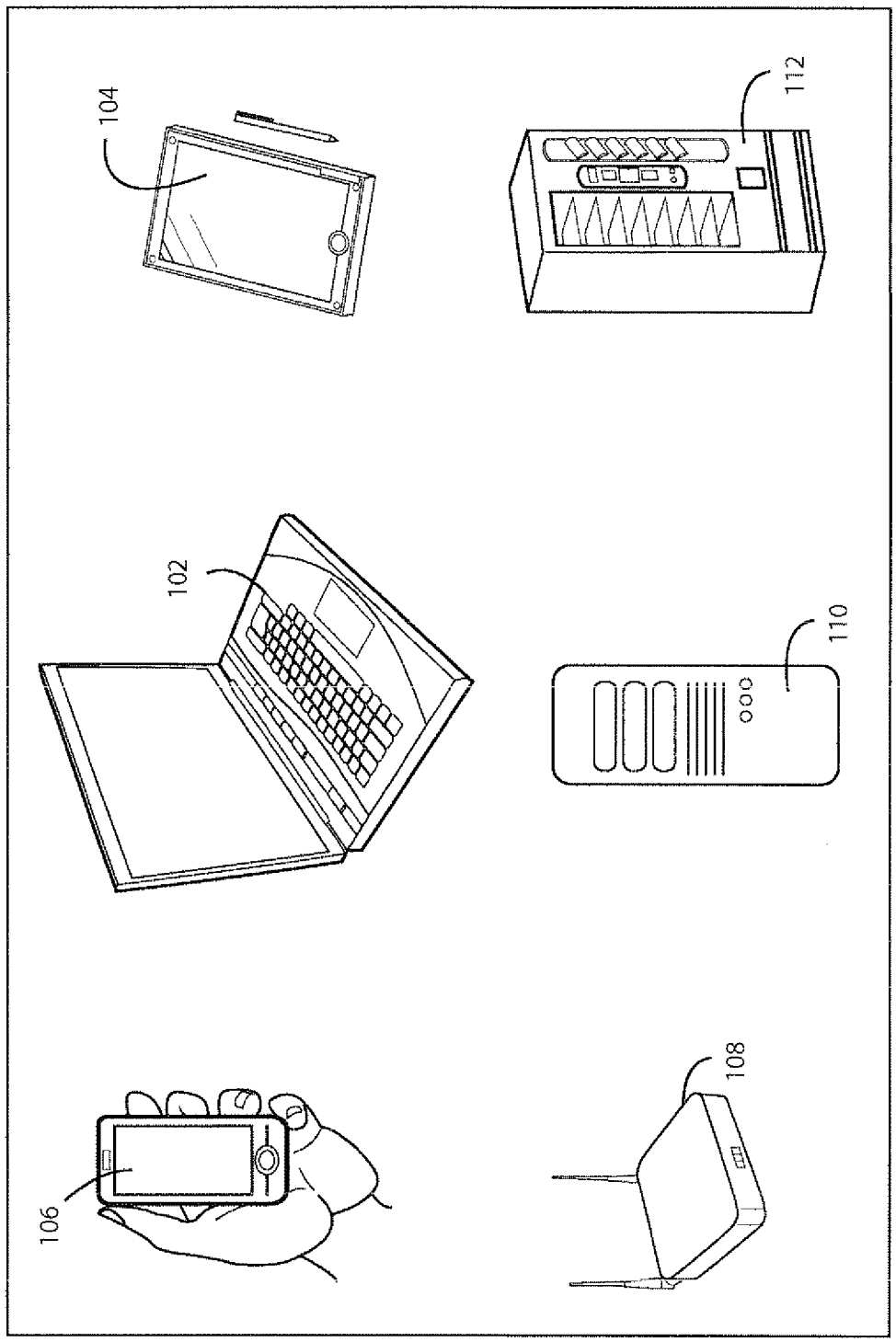

Example User Interfaces
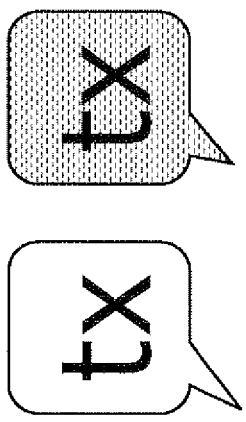
FIG.6A Standard / Secure
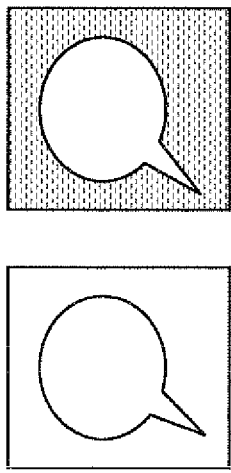
FIG.6B Standard / Secure
FIG.6C Standard / Secure
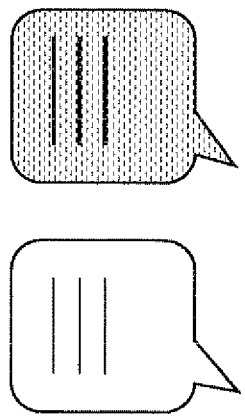
FIG.6D Compose SMS / Compose Secure Txt

USER INTERFACE SYSTEMS AND METHODS FOR SECURE MESSAGE ORIENTED COMMUNICATIONS

CROSS-REFERENCES TO RELATED APPLICATIONS

This application claims the benefit of priority from provisional application No. 61/351,979 filed Jun. 7, 2010, the contents of which are incorporated herein by reference.

STATEMENT REGARDING FEDERALLY SPONSORED RESEARCH OR DEVELOPMENT

N/A

FIELD

The technology herein relates to secure communications, and more particularly to method and apparatus for providing end-to-end secure messaging between disparate portable devices without requiring intermediate secure network infrastructure.

BACKGROUND AND SUMMARY

All across the world, electronic communications is beginning to supplant and replace other communication forms. Portable computing devices have become ubiquitous. Users are now using such devices instead of more traditional means to communicate. It is now common for users to employ their wireless portable devices more for exchanging written or textual messages and photographs than for other tasks. Teenagers especially like text messaging, although texting has become extremely popular all across society.

While open and easy electronic communication between a wide range of users and user devices provides tremendous advantages, it also presents some challenges. One important challenge relates to privacy of communications.

For example, text messages (SMS) are currently one of the most highly vulnerable types of information a mobile workforce can send. With less than $100 worth of equipment, an attacker can intercept and clearly read just about any textual message sent from most portable devices. Yet, every day 2.5 billion text messages are sent in the United States alone. This lack of privacy can have serious consequences.

In one's personal life, a stalker or other undesirable person is now able to intercept and read messages sent from your portable device. Such messages can reveal your whereabouts, activities and future plans, creating opportunities for criminals to attack life, limb and property.

In the business world, employees cautioned to avoid communicating sensitive competitive information via electronic means often nevertheless insist on doing so because electronic communication is typically the most convenient form of communications when on the road, during meetings and in a variety of other situations.

In even more sensitive endeavors such as law enforcement, the military, government policymaking, customs and the like, undesired interception of sensitive information could have far-reaching consequences to our way of life.

Fortunately, powerful electronic encryption techniques exist for protecting electronic communications. Of course, codes and ciphers have been known since ancient times and have been used for electronic communications virtually since the time electronic communications came into existence. For example, during the American Civil War, it was common for both Federals and Confederates to encrypt their telegraph dispatches before transmission. In World War II, the allies achieved a great advantage when cryptographers at Bletchley Park cracked the Enigma code the Germans were using to encrypt sensitive radio dispatches. Since then, secure encryption algorithms based on public key cryptography and/or shared symmetric keys can be efficiently implemented on even low-capability computing devices to provide a high degree of data security. Depending on key length, a typical laptop computer can now encrypt communications in a way that makes it computationally infeasible for an attacker to break or crack the code within any reasonable amount of time.

While strong encryption algorithms are known and in wide use, not all users have access to them. One challenge is the wide array of different kinds of portable devices the average user uses for electronic communicating. Devices come in all forms: netbooks, tablets, cell phones, PDA's, laptops, and many other variations. People now often carry portable laptop or tablet computers or personal digital assistants mostly to allow them to exchange messages electronically. Such devices allow the seamless exchange of text and voice messages, emails, videos, photographs, audio recordings and a range of other electronic media. Many such devices are wireless, allowing information to be exchanged over a variety of different types of networks including for example local or wide area networks, the Internet, Wi-Fi, WiMax, cellular, and other wireless communication protocols and infrastructures. A business user may use three or four different devices (e.g., laptop computer, tablet computing device, PDA, cell phone, etc.), sometimes even simultaneously, to communicate with other users. Each device may use different forms of security, and some devices may have no security at all. For example, many users use a Virtual Private Network (VPN) to create an encrypted "tunnel" between their laptop computer and an enterprise server or firewall. Unfortunately, such VPNs may not be able to be used with some common user devices such as PDA's, iPADS, cell phones, or the like. Some users use Windows or Linux based software such as Pretty Good Privacy (PGP) to encrypt email communications, but that software may not be available for use on other portable devices.

In more detail, FIG. 1 shows an exemplary illustrative non-limiting prior art system or architecture for conveying messages between end-user devices. System 100 can be used with a variety of different kinds of end user or other devices (see e.g., FIG. 1A) including for example wireless or wired laptop computers 102, tablet computers 104, personal digital assistants or cell phones 106, routers 108, or virtually any other kind of device. Any such devices may have a need to communicate messages to any other such device.

In the particular example shown in FIG. 1, wireless connectivity is established between an end-user device such as tablet computer 104 and a personal digital assistant or cell phone 106' via a wireless communications infrastructure such as for example cellular telephone or other wireless transceivers linked together by various computers 118. Computers 118 may include for example, one or more mobile switching centers 120, a short or other message service center 122, and one or more gateway mobile or other switching centers 124. Gateway 124 can provide connectivity via the Internet 126 or other networks with a variety of other wide or local area networks including but not limited to for example a directly-connected server 110, a computing device 128 linked by a hotspot or other access point 130; a local area network 132 connecting multiple computing devices 134 via a firewall 136 and router 108, or any other well known data communications infrastructure.

Briefly, in the example shown in FIG. 1, an end-user device such as 106 generates a message in a particular format. Such message may be formatted as for example an SMS (short message service) or so-called "text" message, a multi-media service (MMS) message, an email, a photograph or graphic, a Word document or other word processing file, a Power Point document, or any other desired format. The user of device 106 wishes to send this message to the user of another end-user device such as device 102' via data communications system 100. Assuming appropriate subscriptions, access permissions and the like are provided and in place, it is no problem for the end user of device 106 to appropriately address the message to the end user of device 102' and transmit it wireless or wired via system 100 for conveyance to the end user of device 102'. In a similar way, messages and data can be exchanged throughout system 100 between the various devices shown.

A problem arises however when an attacker wishes to receive or eavesdrop on the transmitted message without authorization. For example, suppose the end user of device 106 is a law enforcement officer who wishes to notify headquarters of her current location. Such location information would be very useful for a terrorist who wishes to attack and evade detection, or for a criminal who wishes to burglarize a residence without being caught. Similarly, if the end user of device 106 is making a social engagement, a stalker who reads the message may be able to use the intercepted information to threaten the life, limb or property of the user. If the user is exchanging sensitive personal information such as credit card or other financial information or other information that the user does not wish to become widely known or publicly available, the end user may be fooled into thinking that system 100 communicates messages relatively securely. In fact, conventional communications systems such as 100 are highly vulnerable to attack, as FIG. 2 shows.

Unfortunately, nearly every communications link and computer within system 100 can be an entry point for an attacker wishing to intercept and eavesdrop on messages being exchanged between the end user of device 106 and the end user of device 102'. Unauthorized software present on the various devices shown such as viruses can intercept exchange messages and send them to unauthorized individuals. The wireless connections themselves, if used, provide an easy way for any individual with the appropriate equipment to listen in on data communications. The Internet or other network 126 may be a public network that provides ample opportunities for spoofers or other attackers to insert equipment that stores copies of messages being passed and allows the attacker to read them or glean other information from them. The end result is a highly insecure system that has the potential of compromising virtually any message sent across it.

Techniques are currently known for providing additional security in the context of system 100, but generally speaking, such security requires either proprietary devices or software, intermediary computers or other infrastructures or both. For example, some end-user devices 106 such as BlackBerries® have built-in encryption capabilities that encrypt data communications with other BlackBerries®. However, generally speaking, such a solution requires an enterprise server or other infrastructure and is also limited to secure communications between like devices. For example, when sending an SMS or text message from a wireless BlackBerry® to a cellular telephone or a laptop computer, there is generally no way to encrypt the message for security purposes. Other known solutions install special proprietary software on the end-user devices (e.g., Pretty Good Privacy) but such solutions tend to work only with more capable devices such as laptops or netbooks and are not available for the wire variety of less-capable or different devices such as personal digital assistants, cellular telephones, music players, remote control devices, etc.

If secure encryption is not readily available and easy or almost automatic to activate, it is almost inevitable that a user will eventually send sensitive personal, business or other information in clear text form, thereby potentially compromising the information to attackers, spoofers and eavesdroppers. What is needed is a convenient, easy to use, ubiquitous, automatic secure communications capability that can automatically encrypt and decrypt messages over a wide variety of platforms without requiring any special intermediating security components such as gateways, proxy servers or the like. Trusted (verified) and secure (protected) applications are a huge opportunity in the mobile workforce market. Trusted/secure applications for the mobile workforce can significantly improve productivity and effectiveness, while enhancing personal and organizational security and safety.

Example non-exhaustive non-limiting features and advantages of exemplary illustrative non-limiting implementations include:

User selects "Secure" for transmission—no other unique user interaction required Transmissions are kept encrypted unless being viewed Transmission may have durations placed on them such that after a specific length of time they can no longer be decrypted/viewed Encryption and Keys will be standards based (unless otherwise selected by the organization)

User Public/Private key pair is auto generated by the application upon installation Key Rings are only limited by available device memory Keys may be used on multiple mobile devices Optionally, an organization can elect to use a separate Key management system other than the one on the device. Does not require an intermediary Key server

- Able to secure applications that are currently used by literally millions of workers daily. Possible to take these applications and add security which will be ubiquitous and almost invisible to the user
- A Trusted Short Messaging Service (commonly know as "text" for the Blackberry, iPhone, WinMo, Android and other platforms. While it will not prevent the intercept of the Text Message, it WILL prevent anyone from reading it. This has applications for Law Enforcement (FBI, DEA, ATF, etc), DoD, Law Makers (Senate, House, White House), DoJ, TSA, Customs & Boarder,—any agency which has sensitive information Key Management And Modular Encryption Example Market Applications

- Operational on Blackberry 8300 (the primary US Government Model of Phone) and subsequent Models as one example
- Modular Solution Architecture—using the existing device encryption; AES which can be a default; or install an encryption capability can be supplied by the customer or user
- Over-The-Air (OTA) Flexible Key management system (keys may be changed at anytime)
- Optional Central Key management system—each agency can manage their own keys No Gateways required in some embodiments
Revocation of Keys over the air
Auto Sync with Computer
Contact list selection for To:
Contact list annotation of secure receive capability per individual
Simple to use management console for a) Key distribution, b) key management and c) Phone wipe
Implement the ability to wipe the SMS messages over-the-air (OTA)
Implement the ability to wipe the phone (all applications and data) OTA
Trusted and Secure Multimedia Messaging Service (MMS—the ability to send pictures, voice and files direct without email servers)
Fully protected image attachment from camera
Fully protected file attachment
Instant Messaging Secure Communications Chat Application
Secure Communications between laptops/notebooks/netbooks/slates/tablets/phones/desktops/or any other device
Invisible to the user for use, but can supply a visual indicator that the security is in force—such as a lock image or change in color of the screen
Instant security
Router enabled
Wired or wireless (WiFi, 3G, 4G)
Possible to architect and develop specialized applications for Government users as custom solutions
An email App can encrypt the body and attachments of an e-mail
Email App can send the encrypted e-mail through the users e-mail system
No Central or specialized server required
Encryption of files on the phone or laptop
Provides compatibility between mobile phones, mobile computers and office computers
Encryption of Pictures
Compressed and Encrypted
Encryption of Video
Compressed and Encrypted
Example Peer-to-Peer Secure-SMS
  With no server involved, the encryption is between two peers and be fully protected end-to-end
  Using Public/Private key pairs are generated in the device itself by the application and can be changed at any time
  Once a device has established its own Public/Private key pair, it can send an SMS message to the other side in effect saying: "here's my public key". The receiving side can be presented a message "Bob wants to exchange keys with you, ok?". If Alice says "ok," then her application accepts Bob's public key and returns Alice's public key to Bob. Now the two can send each other secure messages in the future as each has added the other to their key ring
Example Management System
  Provides a management system wherein the management system can generate public/private key pairs along with a enterprise identity for a registered user, delivering them securely to each registered end-point
  Distribution can be done remotely
  Once the keys are established, the same procedure as the Peer-to-Peer secure SMS exchange can be followed except that if Alice doesn't have the same enterprise hash present in her key ring, she couldn't accept Bob's Public Key and thus secure communications using the enterprise keys would not be possible. This system would always be peer-to-peer but rely on a secondary enterprise hash to ensure that the peer-to-peer 'club' is restricted to members only
  Key timeout, message expiration etc. Timing can be established such that every message can expire and virtually become unreadable—the length of time can be set by the user or by the enterprise
  Plug-in encryption modules: allows for interchangeable encryption modules that would permit higher-strength or different strength encryption to meet an enterprise requirement
Example Peer to Peer Encrypted Communications
  Independent of the transport (communications medium—cellular, internet, satellite, etc)
  Secure Text messaging (SMS—Short Message Service) without server/intermediary devices
  Stealth Mode for text messaging
  Steganography for additional protection and compression
  Enterprise Key Management System Option
  Secure E-mail
  Secure Multimedia Messaging System (MMS)
  Secure Tweets
  Secure Chat
  Secure Instant Messaging (IM)
  No Intermediary Device (server, host, etc) required for secure transmission
  Fully Protected from the Mobile Device to the Mobile Device
  Storage or memory is use to maintain the data structures, messages and applications
  The Processor executes the application from memory
Example Devices
  Mobile Devices—Phones/PDAs
  Netbooks/Laptops/Notebooks
  Mobile Devices—Pads/Slates/Tablets
  Routers—wired/wireless
  Other Machines—soda, rental, etc
  User Interfaces can be unique to each manufacturer's specification; however, can provide the same user experience as their standard communications devices
  The Text Writing Module can use the same module as the standard message system uses
  The Cryptographic interface is designed to allow multiple cryptographic modules to be used, allowing the cryptology used to be changed without major changes to the applications; this provides for companies, governments, agencies to use different cryptographic algorithms such as AES 256, AES 128, RSA, Blowfish, IDEA, etc.
  The Ciphertext—which what is generated when plain message is converted via encryption—will be compatible with ASCII Text such as ASCII/128 for subsequent transmission enabling communications through most environments. Other transforms such as compression are possible based on the communications conditions or requirements.
  User selects "Secure" for transmission—no other unique user interaction required
  Transmissions are kept encrypted unless being viewed
  Transmission may have durations placed on them such that after a specific length of time they can no longer be decrypted/viewed
  Encryption and Keys standards based (unless otherwise selected by the user or organization)
  User Public/Private key pair is auto generated by the application upon installation Key Rings are only limited by available device memory Keys may be used on multiple mobile devices Optionally, an organization can elect to use a separate Key management system other than the one on the device

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 1A shows non-exhaustive examples of end user or other devices that can be employed;

FIGS. 6A-6D show exemplary illustrative non-limiting user interface selection arrangements;

DETAILED DESCRIPTION OF EXAMPLE NON-LIMITING IMPLEMENTATIONS

Figure 1:
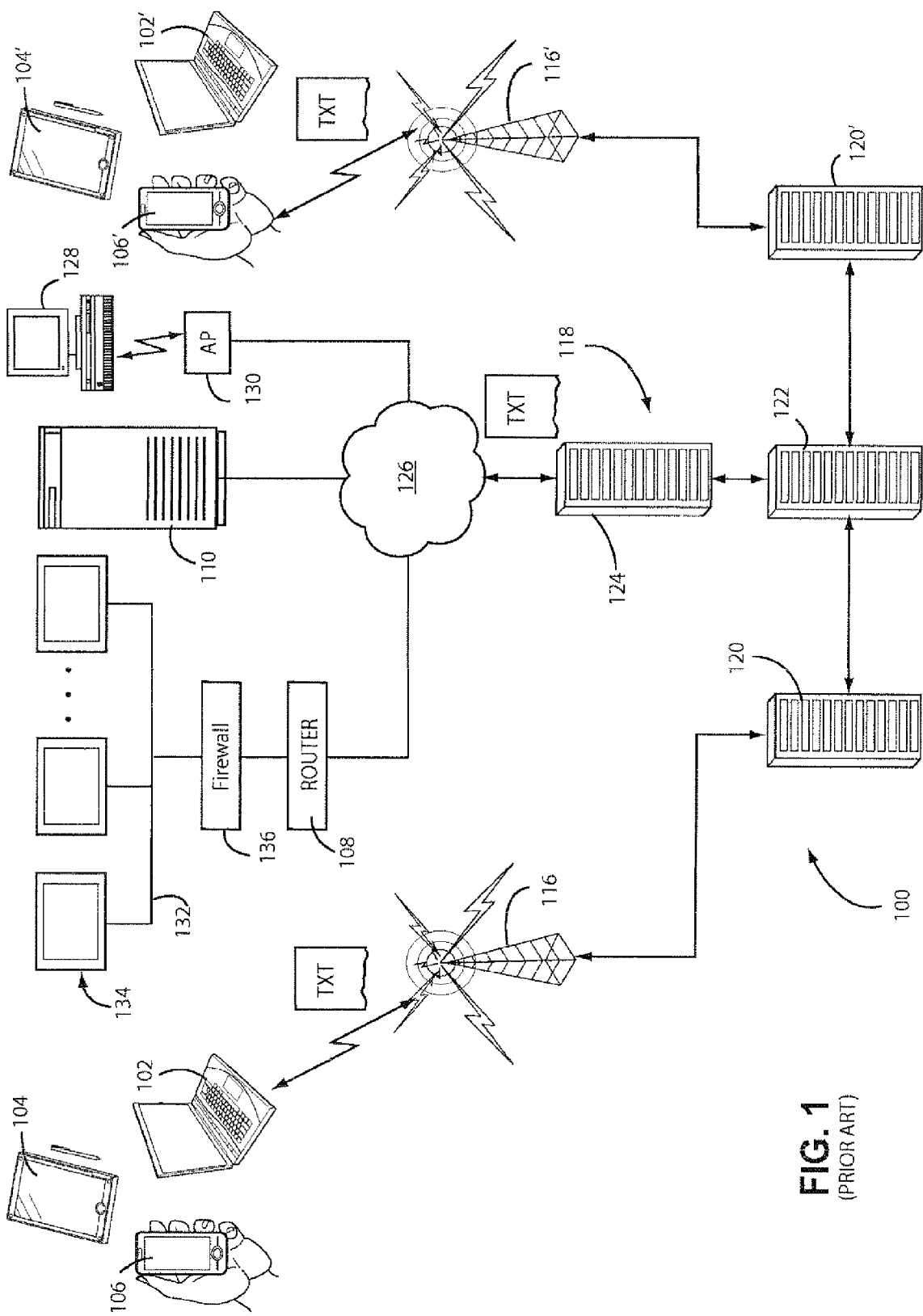
FIG. 1 schematically illustrates an exemplary illustrative non-limiting prior art conventional text or other messaging communication system.
Figure 3:
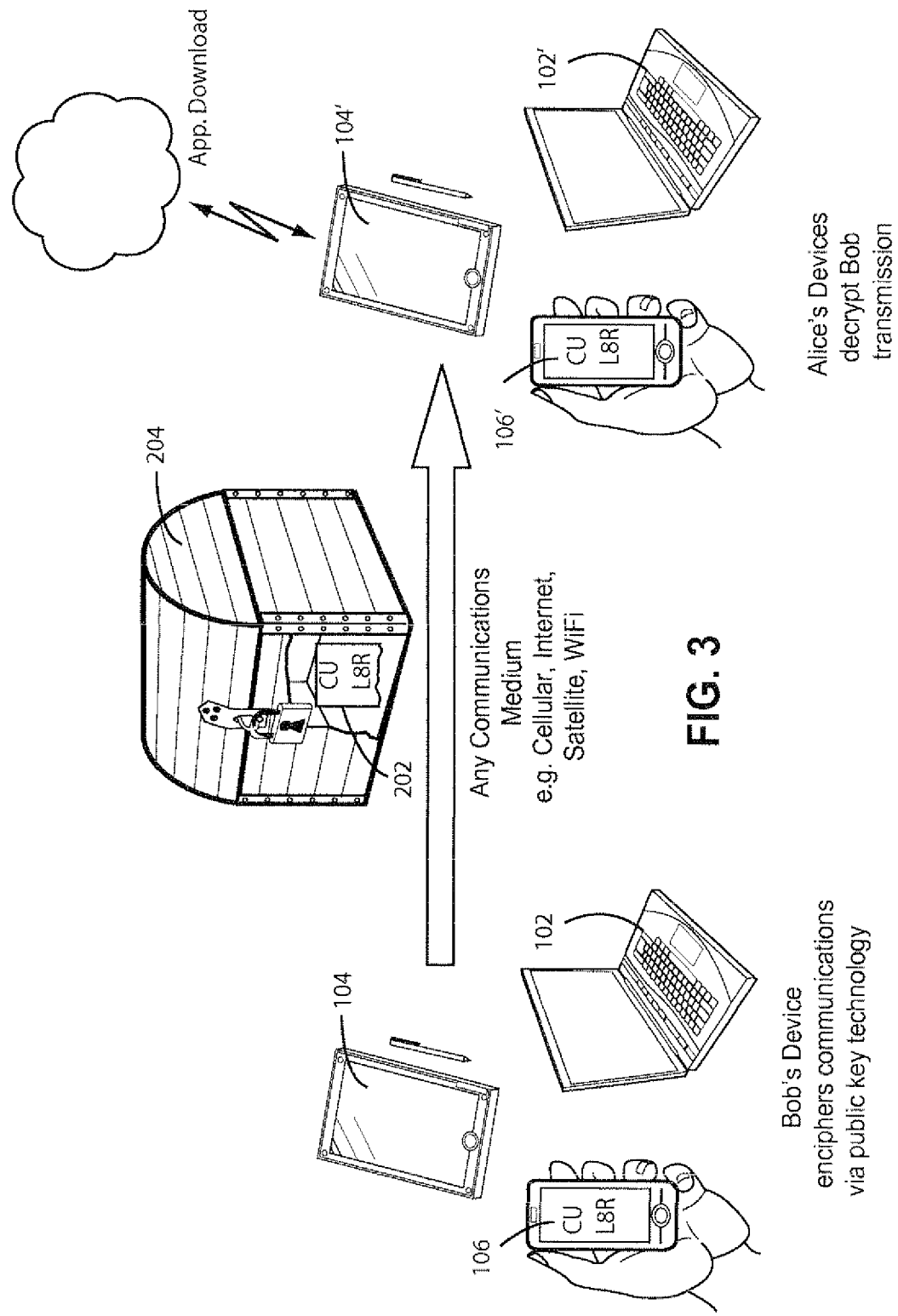
FIG. 3 shows one way that end-to-end security can be provided irrespective of the communications medium and without requiring any intermediary device for secure transmissions.

FIG. 3 shows an exemplary illustrative non-limiting implementation that provides secure communications between end-user device 106 and end-user device 102' (or 106') without requiring any intermediary device such as a server, host, etc., for secure transmission and which can work over any communications medium (e.g., cellular, Internet, satellite, Wi-Fi, etc.) and with virtually any user device including those shown in FIG. 1A. In the example shown, the end-user devices 102, 104, 106 are used by an end user named "Bob," and end-user devices 102', 104', 106' are used by an end user "Alice." Bob wishes to send a secure communication to Alice. Conventionally, it is known for Bob's device 106 to encrypt the message to an encryption key known by Alice's device 106, (e.g., Alice's public key) before sending the message. In this drawing, the message that Bob wishes to send ("C U L8R") 202 is thus encrypted by Bob's device 106 using Alice's public key (as represented by the lockbox 204). When Alice's device 106' receives the encrypted message, Alice's device can open the lockbox 204 by decrypting using Alice's corresponding private key in order to read and display the message 202. The problem arises if Alice's device 106'—like most portable devices in the world today—have no capability to encrypt and decrypt messages, or have only proprietary encryption/decryption solutions that cannot be used for the free exchange of texts or other messages over public networks. In this instance, the exemplary illustrative non-limiting implementation provides a download-on-demand application and associated protocol that allows any device such as those shown in FIG. 1A to quickly download an application that can coexist with other applications on the end-user device 106' without interfering with those other applications, and which can be used to immediately begin decrypting and encrypting messages.

Figure 4A:
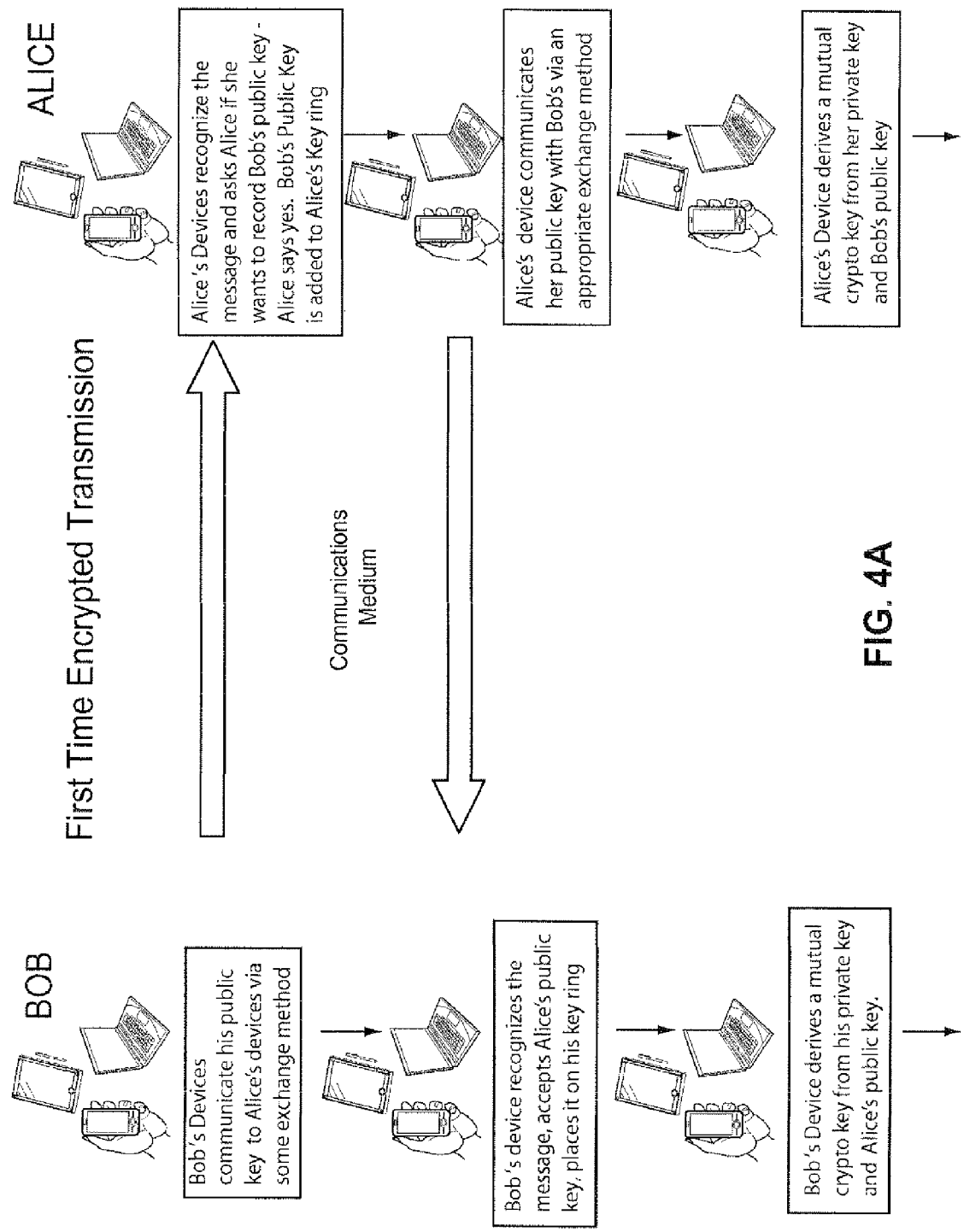
FIGS. 4A, 4B show an exemplary illustrative non-limiting protocol and flow arrangement for establishing secure communications between two end-user devices.
Figure 4B:
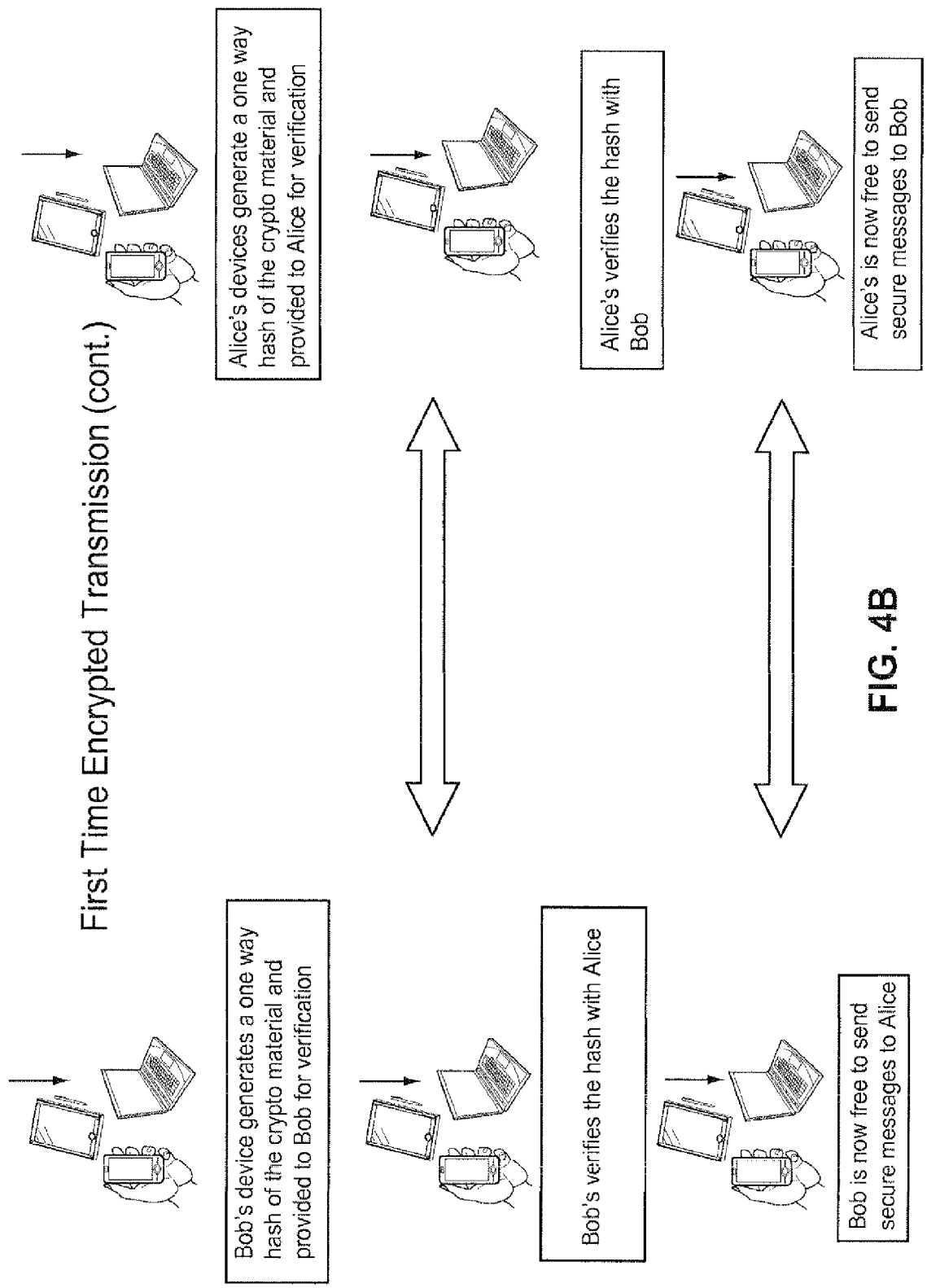

FIGS. 4A, 4B show an example first time encrypted transmission protocol that can be used. In the examples shown, Bob's end-user device 106 communicates his public key to Alice's device via some exchange method. The communications medium used can be any desired medium (e.g., cellular, Internet, SMS, Satellite, WiFi, Bluetooth, Token exchange, Email, VCF, other acceptable in/out-of-band methodology, etc. The offer may be time limited and may be facilitated by a trusted third party. Bob's public key can be made public without comprising security because, as is known to those skilled in the art, it is computationally infeasible to derive Bob's private key from his public key.

Upon receiving this message, Alice's device 106' may not know how to handle it. If this is the first time Alice's device 106' has received a secure message, it may need to be prepared—in the exemplary illustrative implementation by downloading an application on demand from the Internet 126 or via system 100 or otherwise. This download can be provided in any number of ways such as via iTunes, web server, or any other desired arrangement. This download can be prompted by including clear text in the message that Bob's device 106 sends to Alice that says for example:

Bob wishes to send you an encrypted text message. Do you want to receive it? If so, please download the following application from this network location: [specify name/network address/URL, etc.]

Upon receiving this message, if Alice wishes to proceed, she can control her device 106' to download the application, possibly incurring a license fee charge to her cellular telephone or wireless account or iTunes account or the like. The download server can detect the type of device Alice is using and download code that is able to run on Alice's device. Of course, if Alice's device 106' already has this code resident, there is no need for it to download a new code, although in some instances receipt of the message may trigger Alice's device 106' to download an update if one is available.

When the application first becomes resident on Alice's end-user device, it may automatically generates a private key for Alice's end-user device 106' using conventional technology (e.g., by using random or pseudo random information already present on and/or which can be generated by Alice's device). The downloaded application at the same time generates a corresponding public key and stores both on Alice's device 106' key ring.

Once Alice's device 106' has appropriate software resident, it recognizes the message and asks Alice if she wants to record Bob's public key. If Alice says yes, Bob's Public Key is added to Alice's Key ring. Alice's device then communicates her public key with Bob's via an appropriate exchange method as described above. Bob's device recognizes the message, accepts Alice's public key, places it on his key ring. Bob's device then derives a mutual cryptographic key ("shared secret") from his private and Alice's public key. Alice's device also derives a mutual cryptographic key (the same "shared secret") from her private and Bob's public key. Bob's device generates a one way hash of the crypto material and provided to Bob for verification. Alice's device also generates a one way hash of the crypto material and provided to Alice for verification. Bob's device verifies the hash with Alice and Alice's device verifies the hash with Bob using any desired communications means (e.g., Cellular, Internet, Satellite, WiFi, Bluetooth, Token exchange, Email, Voice, other acceptable in/out-of-band methodology, etc). Alternately, Bob and Alice can perform this exchange via e-mail, snail mail, PSTN, USB File exchange, etc. Once this two-way challenge-response verification protocol is complete, Bob is now free to send secure messages to Alice and Alice is now free to send secure messages to Bob.

For example, Bob's device 106 may now encrypt the text message with the shared secret before transmitting it to Alice's end-user device 106' as ciphertext. Upon receipt, Alice's end-user device 106' decrypts the ciphertext message using the shared secret for display. Similarly, Alice's device 106' may now also encrypt the text message with the shared secret before transmitting it to Bob's end-user device 106' as ciphertext. Upon receipt, Bob's end-user device 106' decrypts the ciphertext message using the shared secret for display or other functions or commands. All transmissions remain encrypted on the devices in the exemplary illustrative non-limiting implementation and are decrypted only for transitory display.

Thus, in this exchange, one does not need to use the public key to encrypt data in this type of exchange. One only uses it as a means to generate mutually derivable crypto material (shared secret) which will then be used as the basis to encipher the data to be communicated. Otherwise anyone who has the public key itself would be able to decipher the information. It is the pairing of Alice's private key and Bob's public key along with Bob's private key and Alice's public key that allows each side to derive the same unique mutual information used to derive the ultimate key. There is no need to encrypt the public keys. What happens is that once each side has the other's public key, they derive mutual crypto material. After that is derived, each side creates a hash of the crypto material or artifact of the derivation process and uses that to verify via some out of band method that the exchange was not intercepted by a malicious party.

In the exemplary illustrative non-limiting implementation, Bob and Alice first exchange their PUBLIC keys. Their PRIVATE keys are always kept private. On receipt of Bob's PUBLIC key, Alice can choose to "accept" Bob's PUBLIC key. If she does, she can now send to Bob her PUBLIC key encrypted with Bob's PUBLIC key. Assuming that the key exchange was not intercepted initially, only BOB can get Alice's PUBLIC key and trust that it came from Alice. Once each side has verified the other's PUBLIC key, then they each generate a mutual cryptographic key from their PRIVATE key and the other's PUBLIC key. This generates a unique key between the two parties. For added security, the device on each side generates a one-way hash of the crypto material and Bob & Alice can verbally (or otherwise) verify the hash. If verified, secure communications can begin. Alice's PUBLIC key is public but by encrypting it with Bob's Public Key, only Bob can decrypt Alice's message and therefore at least partially verify this came from Alice who had Bob's Public key. Once Bob & Alice have exchanged PUBLIC keys, each can generate a new cryptographic key that is derived from their PRIVATE key and the other's PUBLIC key. That is the key that is then used for sending secure SMS. This is thus an abstraction layer above the Public/Private key pair in the exemplary illustrative non-limiting implementation.

Figure 2:
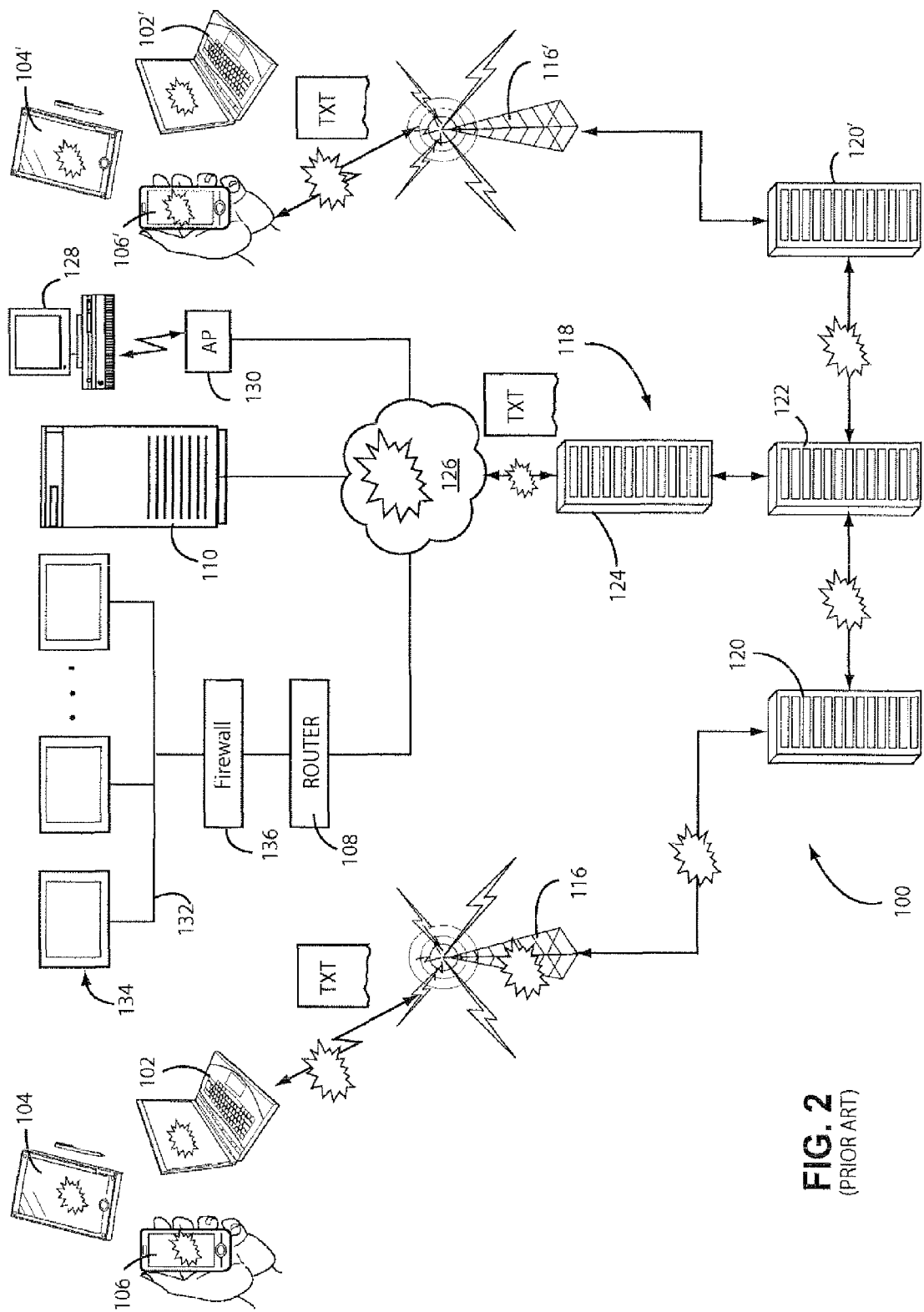
FIG. 2 shows multiple vulnerabilities present in the FIG. 1 prior art system.
Figure 5:
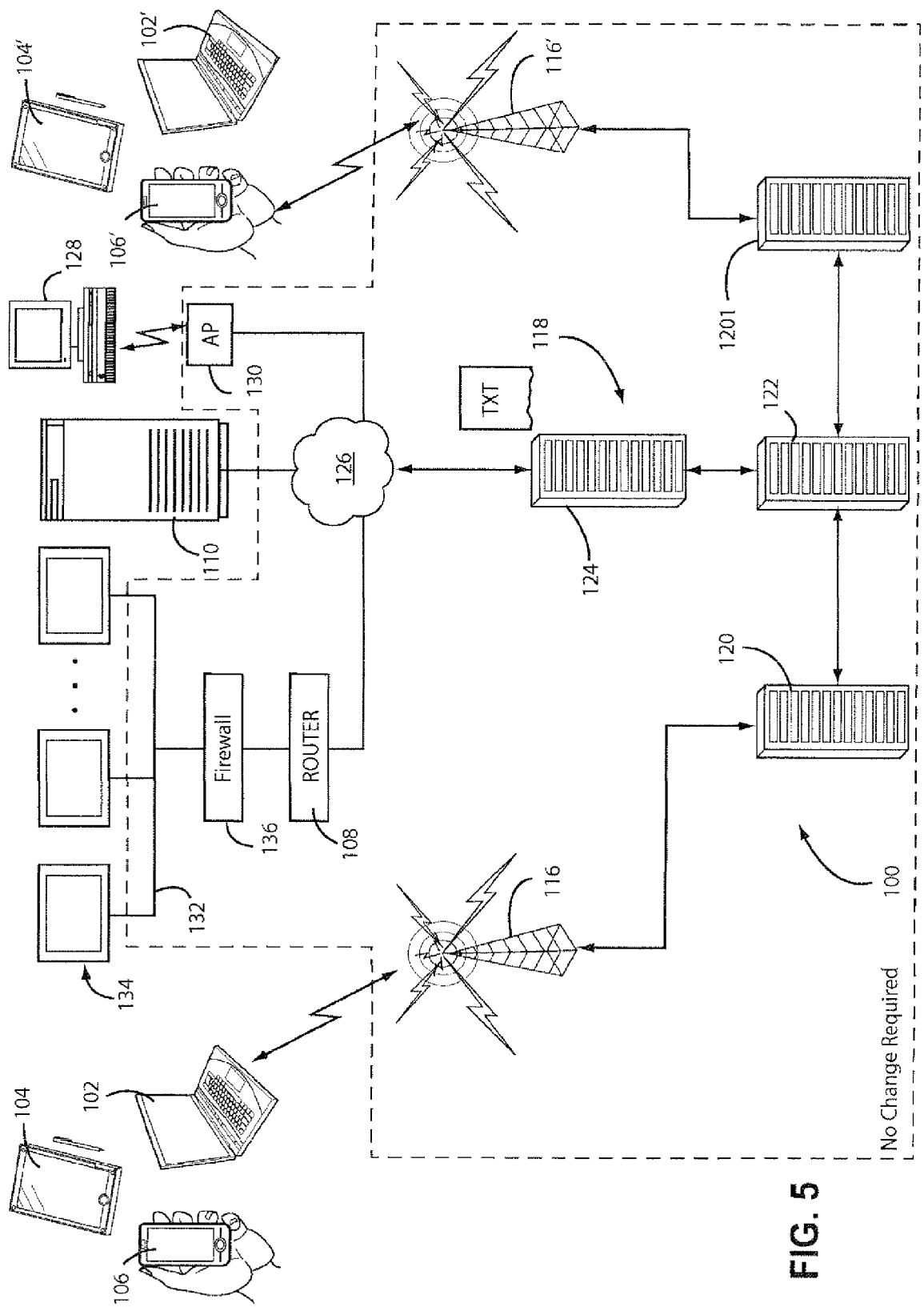
FIG. 5 shows how the FIGS. 4A, 4B arrangement does not impact or require any changes to the communication infrastructure while nevertheless providing end-to-end security.

As FIG. 5 shows, the encrypted forms of communication shown in FIGS. 4A, 4B are all fully supported by existing infrastructure in the exemplary illustrative non-limiting implementation. No modification to infrastructure 100 is required, since all of the messaging shown in FIGS. 4A, 4B follows the format or and appears to be a conventional SMS or other message. Because end-to-end encryption is provided, however, the security threats shown in FIG. 2 are eliminated. Even if an eavesdropper or attacker is able to intercept a message, he will not be able to open or read it because it is securely encrypted.

Figure 5A:
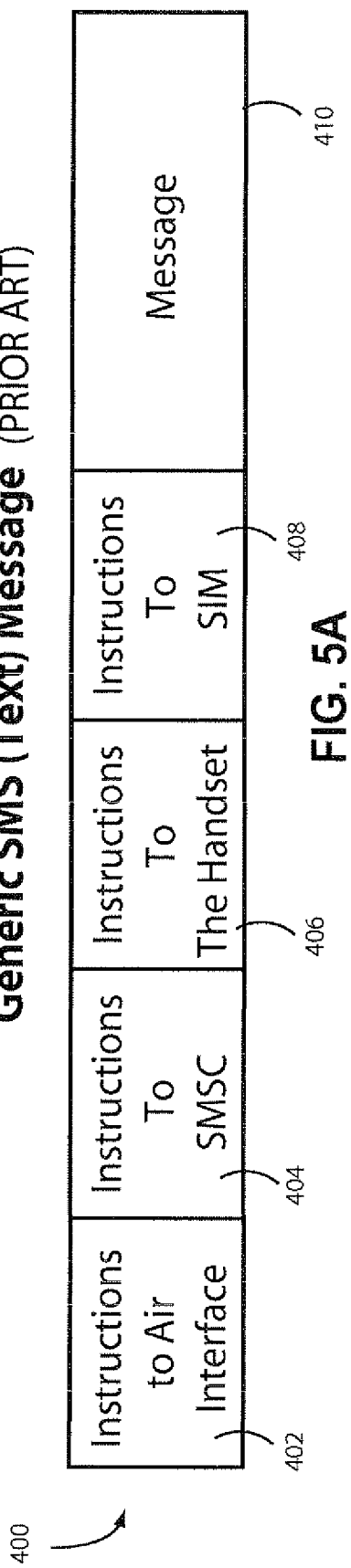
FIGS. 5A-5B show example message transmission protocols.
Figure 5B:
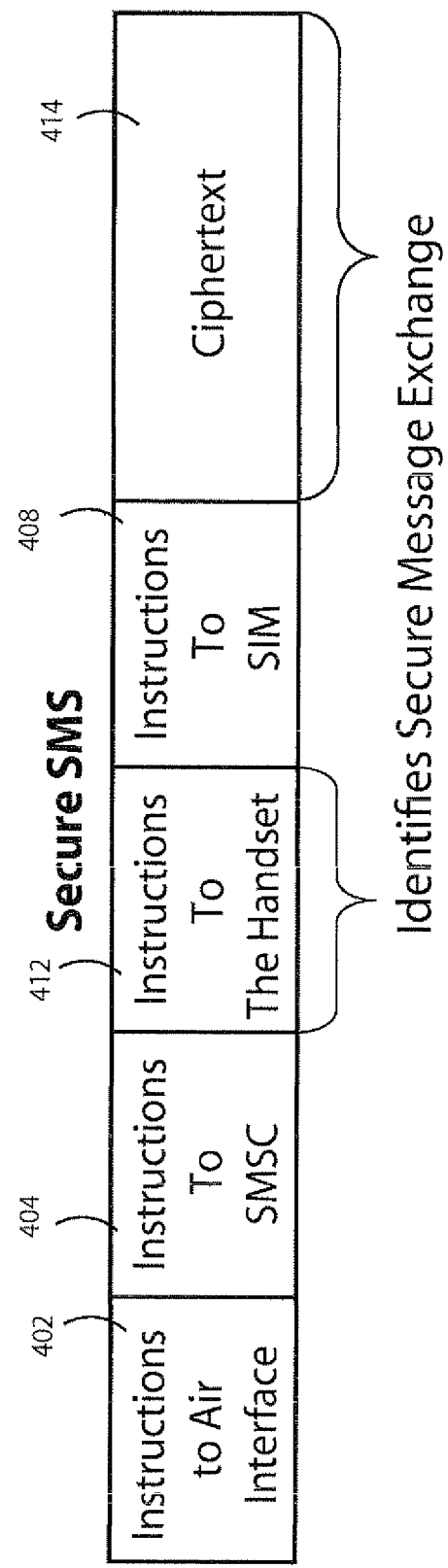

FIGS. 5A and 5B show how the FIGS. 4A, 4B protocol can be used to provide secure messaging that is fully compatible with existing infrastructure 100. FIG. 5A shows a generic SMS (text) message 400 including for example the following fields:

instructions to air interface 402
instructions to SMSC 404
Instructions to handset 406
instructions to SIM 408
message or payload 410.

As FIG. 5B shows, the routing fields 402, 404, 408 may be sent unchanged in order to provide full compatibility with the existing infrastructure. However, for example, some or all of the "instructions to the handset" field 406 may be modified to provide an enhanced field 412 that instructs receiving end-user device 106' that the just-received message is encrypted. In addition, the clear text message may be replaced by a ciphertext message that can be opened, as explained above only with the appropriate private key.

FIGS. 6A-6D show example user interfaces that may be displayed by end-user devices to provide normal and secure options. In one exemplary illustrative non-limiting implementation, the secure option may be identical to the normal option already available on conventional devices except that it colors the icon red or some other distinctive color. This allows the user to easily select secure or non-secure communications with a simple touch of a button or tap of a stylus. In other examples, distinctive secure icons showing a padlock or which use the word "secure" may be provided. To send a secure message, the user simply selects the secure icon; to send a typical insecure message, the end user selects the standard icon.

Figure 7:
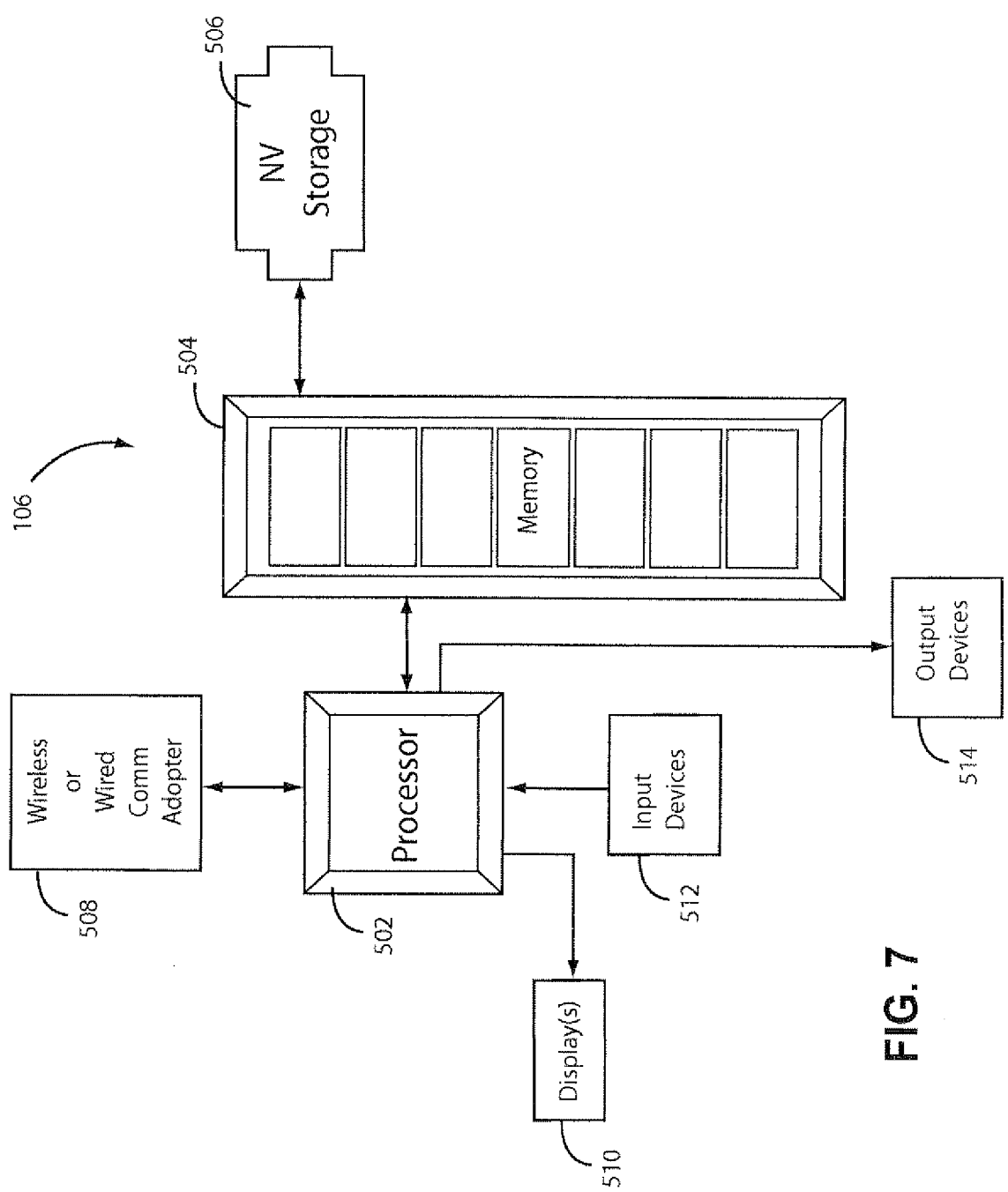
FIG. 7 shows an exemplary illustrative non-limiting end-user device architecture.

FIG. 7 shows an exemplary illustrative non-limiting end-user device 106 including, for example, a processor 502, a memory 504, and non-volatile storage 506. In the example shown, the processor 502 communicates with memory 504, and non-volatile storage 506 may also communicate with the processor either directly or through memory 504. The processor may communicate with the outside world via a wireless or wired communications adapter 508. A user may communicate with device 106 through a user interface provided for example by display or displays 510, input devices 512 and output devices 514. The display or displays 510 may comprise for example liquid crystal displays, plasma displays, rasterized displays, touch screens, or any other variation or other conventional display device. Input devices may include input keys, touch screen keys, pushbuttons, virtual buttons displayed on a touchscreen, voice activated commands, accelerometers or other motion detectors, light sensors (with or without pattern recognition capabilities), barcode readers, or any other device capable of conveying information to processor 502. Output devices 514 may include indicator lights, audio speakers, laser outputs, tactile output devices, printers, light projectors, feedback devices or any other output device desirable to provide a humanly perceivable or other output indicia.

Figure 8:
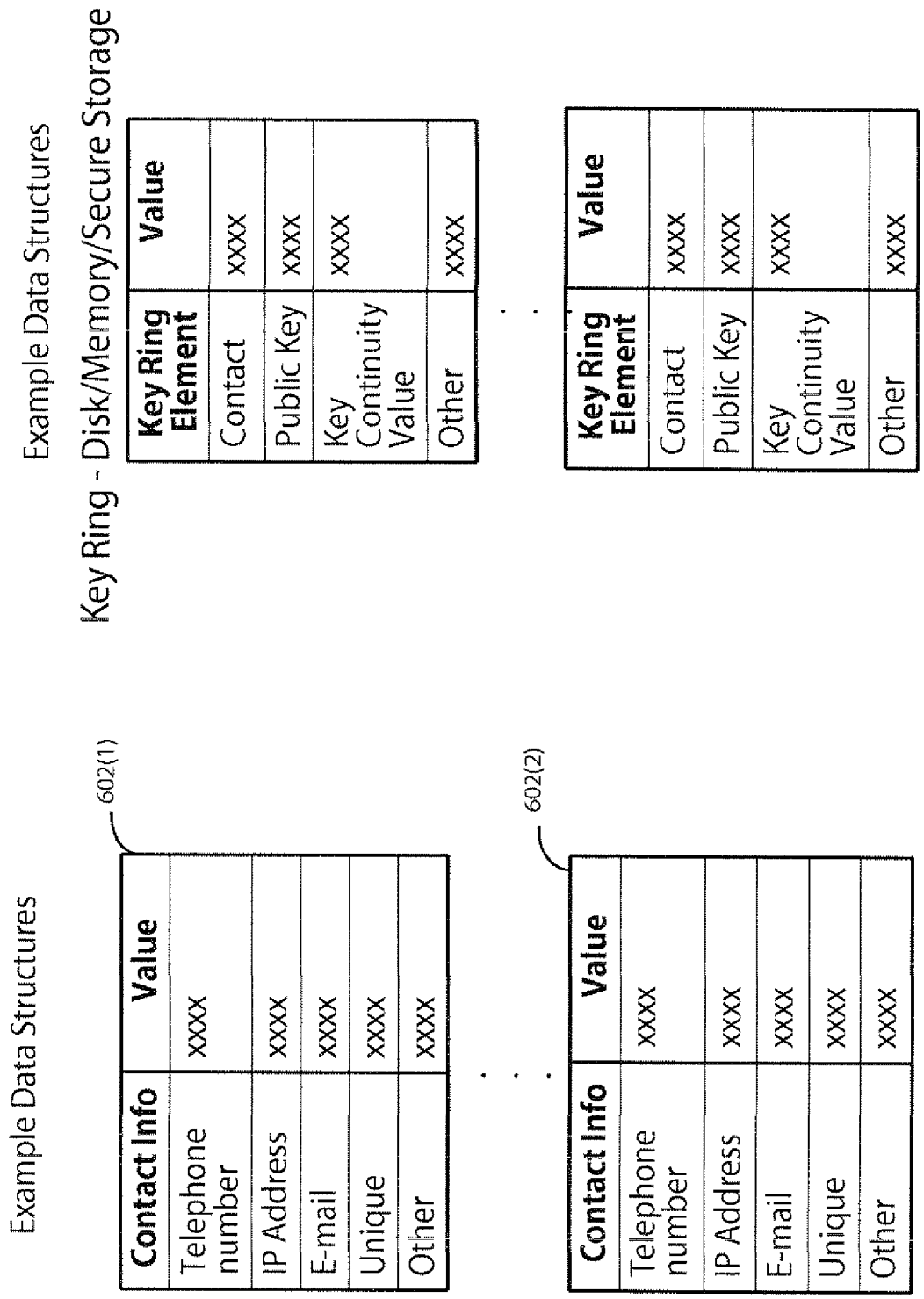
FIGS. 8A, 8B show example non-limiting data structures.

In the example shown, the memory 504 may contain a variety of programs and data for manipulation and/or execution by processor 502. Non-volatile storage 506 (which in some exemplary or illustrative implementations may comprise a SIM card, SD card, magnetic disk, optical memory, flash memory, Disk, EPROM, PROM, SSD or any other non-volatile storage device) may supply programs including the application mentioned above to memory 504 for execution by processor 502. Storage or memory is used to maintain the data structures, messages and applications, and the processor executes the application from memory. For example, memory 504 in conjunction with non-volatile storage 506 may store data structures such as shown in FIGS. 8A, 8B that link user identification information (e.g., telephone number, IP address, email address, name, other unique or non-unique identifier) with associated public keys. Any number of such records 602 may be stored in non-volatile storage 506 and/or memory 504. Different public keys can be associated with different applications if desired, so that for example one public key could be used to communicate with Alice securely via texting, while a different public key could be used for communicating with her via her IP address, etc. Additional data structures stored in the memory may comprise a key ring (e.g., in disk/memory/secure storage) that includes one or a plurality of key ring elements, each comprising for example Contact, Public Key, Key Continuity Value, Other).

Figure 9:
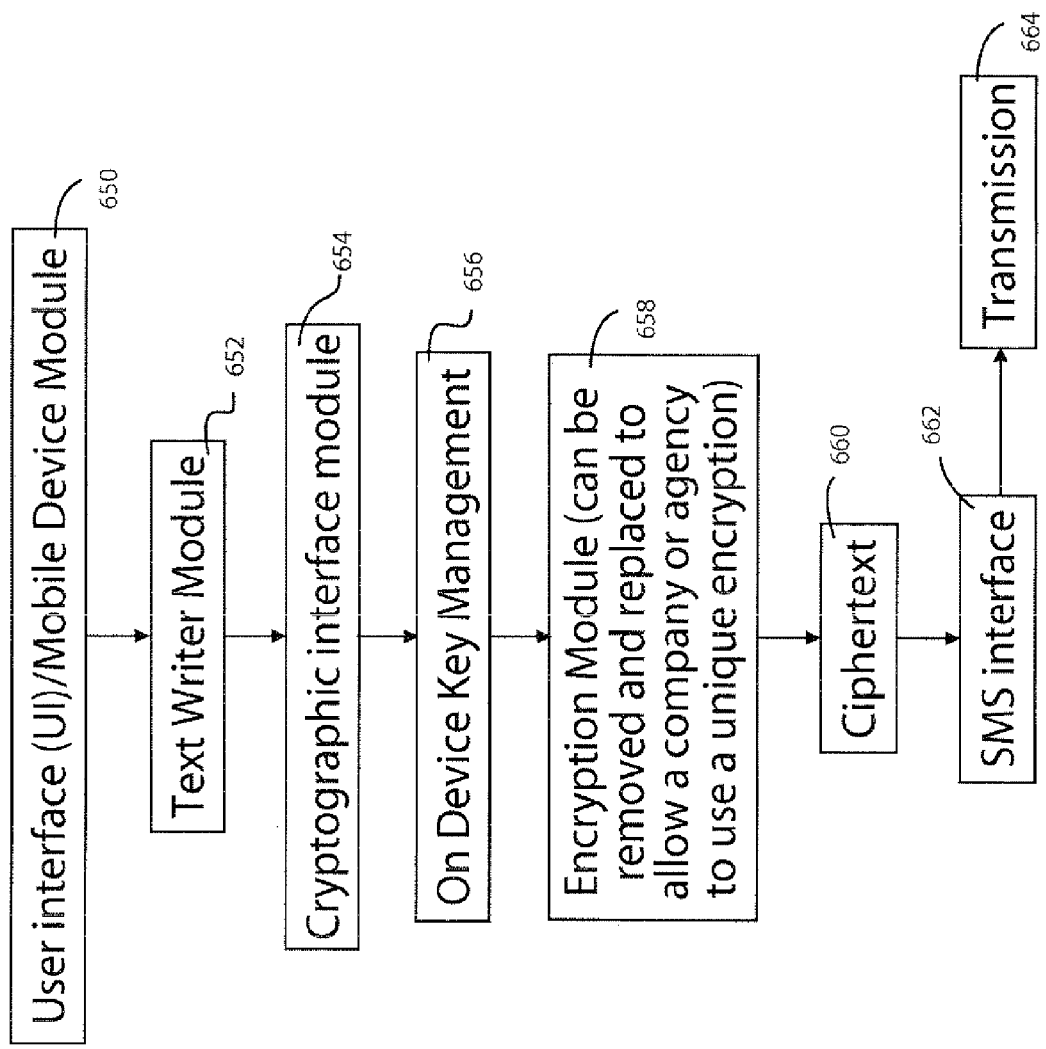
FIG. 9 shows an exemplary illustrative non-limiting flowchart of program control steps.

FIG. 9 shows an exemplary illustrative non-limiting flowchart of program control steps performed by processor 502 to implement the technology described herein. FIG. 9 also shows a software architecture/structure that an application stored in memory 504 may define for execution by and control of processor 502. In the example shown, a user interface module 650 may communicate with at text writer module 652 to allow the end user to compose a text or other message. The text writer module 652 may supply this conventional message to a cryptographic interface module 654 which uses on-device key management module 656 for managing public and private keys. An encryption module 658 may be used to encrypt the text or other message into cipher text 660. The encryption module may comprise any conventional encryption engine, including for example AES or the like. The encryption module can be removed and replaced to allow a company, agency or end user to use a unique encryption algorithm. A cipher text 660 in the exemplary illustrative non-limiting implementation is supplied to the SMS interface 662 for transmission 664.

While the technology herein has been described in connection with exemplary illustrative non-limiting embodiments, the invention is not to be limited by the disclosure. For example, while public key cryptography is described above in connection with exemplary illustrative non-limiting implementations, symmetric key cryptography, steganography, one time pad, or any other conventional technique using a shared secret to provide security may be used. While the exemplary illustrative non-limiting implementations are described in connection with wireless communications using SMS, any wired or wireless protocol using any messaging convention can be used. The invention is intended to be defined by the claims and to cover all corresponding and equivalent arrangements whether or not specifically disclosed herein.

What is claimed is:

1. A method of providing end-to-end encrypted communications between a first end-user device including a first end-user device processor and a second end-user device including a second end-user device processor, the method comprising:

determining with the first end-user device processor whether the second end-user device is configured to securely communicate with the first end-user device;

if the determining determines the second end-user device is not configured to securely communicate with the first end-user device, the first end-user device processor configuring the first end-user device to send a clear text communication to the second end-user device;

if the determining determines the second end-user device is configured to securely communicate with the first end-user device, the first end-user device processor configuring the first end-user device to selectively send any of a clear text communication and a cipher text communication to the second end-user device;

autogenerating, with the first end-user device processor, a Public/Private key pair;

agreeing upon at least one shared secret based on a handshake communication between the first and second end-user devices without revealing the shared secret through the handshake communication, the first end-user device processor and the second end-user device processor each deriving at least part of the shared secret based at least on the Public key of the Public/Private key pair;

conditioned on the first end-user device processor configuring the first end-user device to enable the first end-user device to send a cipher text communication to the second end-user device, securely communicating an encrypted message from the first end-user device to the second end-user device, without requiring the encrypted message to be decrypted intermediate of the first end-user device and the second end-user device;

decrypting, using the shared secret, the communicated encrypted message at the second end-user device into message clear text;

the second end-user device making the message clear text available to a user only while the message clear text is being used; and enabling downloading on demand of a secure communications application to the second end-user device, the secure communications application configuring the second end-user device to decrypt secure messages sent by the first end-user device and to encrypt secure messages to send to the first end-user device.

2. The method of claim 1 wherein said communicated encrypted message comprises an encrypted SMS message.

3. The method of claim 1 further including encrypting, at the first end-user device, an SMS message for decryption by the second end-user device.

4. The method of claim 1 further including, if said first device processor determines that the second end-user device is configured for secure communication with the first end-user device, communicating an unencrypted message from the first device to the second device, said message providing an indication that the first device wishes to send a secure message to the second device.

5. The method of claim 1 wherein the agreed-upon shared secret is derived from the public key autogenerated by the first end-user device and a public key associated with the second end-user device.

6. The method of claim 5 wherein the first end-user device processor autogenerates the user Public/Private key pair upon download or installation of a security application used to enable secure message communications.

7. The method of claim 1 wherein the first and second end-user device processors keep the communicated encrypted message encrypted except while the message clear text is being viewed by a user executing an application that coexists with other applications on the first and second end-user devices without interfering with the other applications.

8. The method of claim 1 wherein the secure communications capability is transparent to the user.

9. The method of claim 1 wherein determining whether the second end-user device is configured to securely communicate with the first end-user device is based on a challenge-response verification protocol, including:
sending a challenge to the second end-user device,
receiving a response to the challenge from the second end-user device, and
testing the response to the challenge by verifying a cryptographic hash value.

10. A system for providing end-to-end encrypted communications between a first end-user device and a second end-user device such that encrypted messages sent from the first end-user device to the second end-user device remain encrypted until decrypted by the second end-user device, the system comprising:
a first end-user device including a first processor;
a second end-user device including a second processor, the first device processor being configured to determine whether the second end-user device is configured for secure communications with the first end-user device;
the first and second end-user devices configuring to send clear text messages therebetween when the first device processor determines the second end-user device is not configured for secure communications with the first end-user device;
the first and second end-user devices being further structured to each generate a public/private key pair, to each derive at least part of the at least one shared secret based at least in part on a public key and to agree upon at least one shared secret based on a handshake communication between the first and second devices, the handshake communication being used to provide agreement between the first and second devices on the at least one shared secret without revealing the shared secret through communications between the first and second devices;
the first and second devices configuring to selectively communicate any of a clear text communication and a cipher text communication therebetween, based on at least the first processor determining that the second end-user device is configured for secure communications, including communicating an encrypted message between the first device and the second device without requiring the encrypted message to be decrypted intermediate of the first and second devices, and to use the shared secret to decrypt the encrypted message;
the first and second devices being further configured to keep the communicated encrypted messages encrypted except while being used or viewed.

11. The system of claim 10 wherein the first device processor determines whether the second device is configured for secure communications based on a challenge-response verification protocol that includes the first device sending a first challenge to the second end-user device and receiving a first response to the first challenge, the second device sending a second challenge to the first end-user device and receiving a second response to the second challenge from the first end-user device, the first end-user device first processor being configured to test the first response, and the second end-user device second processor being configured to test the second response.

12. An end-user device providing end-to-end secure encrypted communications with a further end-user device, the end-user device comprising:
a processor;
a display coupled to the processor
a communications module coupled to the processor; and
a storage device coupled to the processor, the storage device storing program instructions that when executed by the processor control the processor to:
automatically generate a public/private key pair;
determine whether the further end-user device is configured to securely communicate;
conditioned on the processor determining that the further end-user device is not configured to securely communicate, configuring to exchange clear text communications with the further end-user device;
agreeing with the further device on at least one shared secret based on a handshake communication between the device and the further device, including deriving at least part of the shared secret based at least in part on the public/private key pair and determining whether the further device agrees on the shared secret without revealing the shared secret through the handshake communication;
conditioned on the processor determining that the further end-user device is configured to securely communicate, configuring to exchange any of clear text and cipher text communications with the further end-user device, including receiving an encrypted message from the further device and using the shared secret to decrypt the received encrypted message into message clear text without requiring the encrypted message to be decrypted and re-encrypted intermediate of the first and further devices; and
keep the received encrypted message encrypted except while the processor displays or is otherwise using the message clear text.

13. The device of claim 12 wherein said message comprises an SMS message.

14. The device of claim 12 wherein the processor is configured to encrypt, an SMS message.

15. The device of claim 12 wherein the processor is configured to encrypt, an MMS message.

16. The device of claim 12 wherein the device is configured to enable downloading on demand of an application permitting the device to decrypt a secure message sent by the further device.

17. The device of claim 12 wherein the agreed-upon shared secret is unique to the device and the further device and the shared secret is derived from a public key associated with the device and a public key associated with the further device.

18. The device of claim 12 wherein the processor is further configured to autogenerate a user Public/Private key pair.

19. The device of claim 18 wherein the processor autogenerates the user Public/Private key pair upon download or installation of a security application used to communicate secure messages.

20. The device of claim 12 wherein the device is configured to keep communicated encrypted message encrypted except while being viewed by executing a downloaded application that coexists with other applications on the device without interfering with other applications.

21. The device of claim 12 wherein the secure communications capability is transparent to the user.

22. The device of claim 12 wherein execution of the instructions to determine whether the further end-user device is configured for secure communications implements a two-way challenge-response verification protocol comprising the end-user device sending a first challenge to the further end-user device and receiving a first response to the first challenge, the further end-user device sending a second challenge to the end-user device and receiving a second response to the second challenge from the end-user device, and verifying a cryptographic hash value provided by the first response.

* * * * *